Patented Oct. 30, 1923.

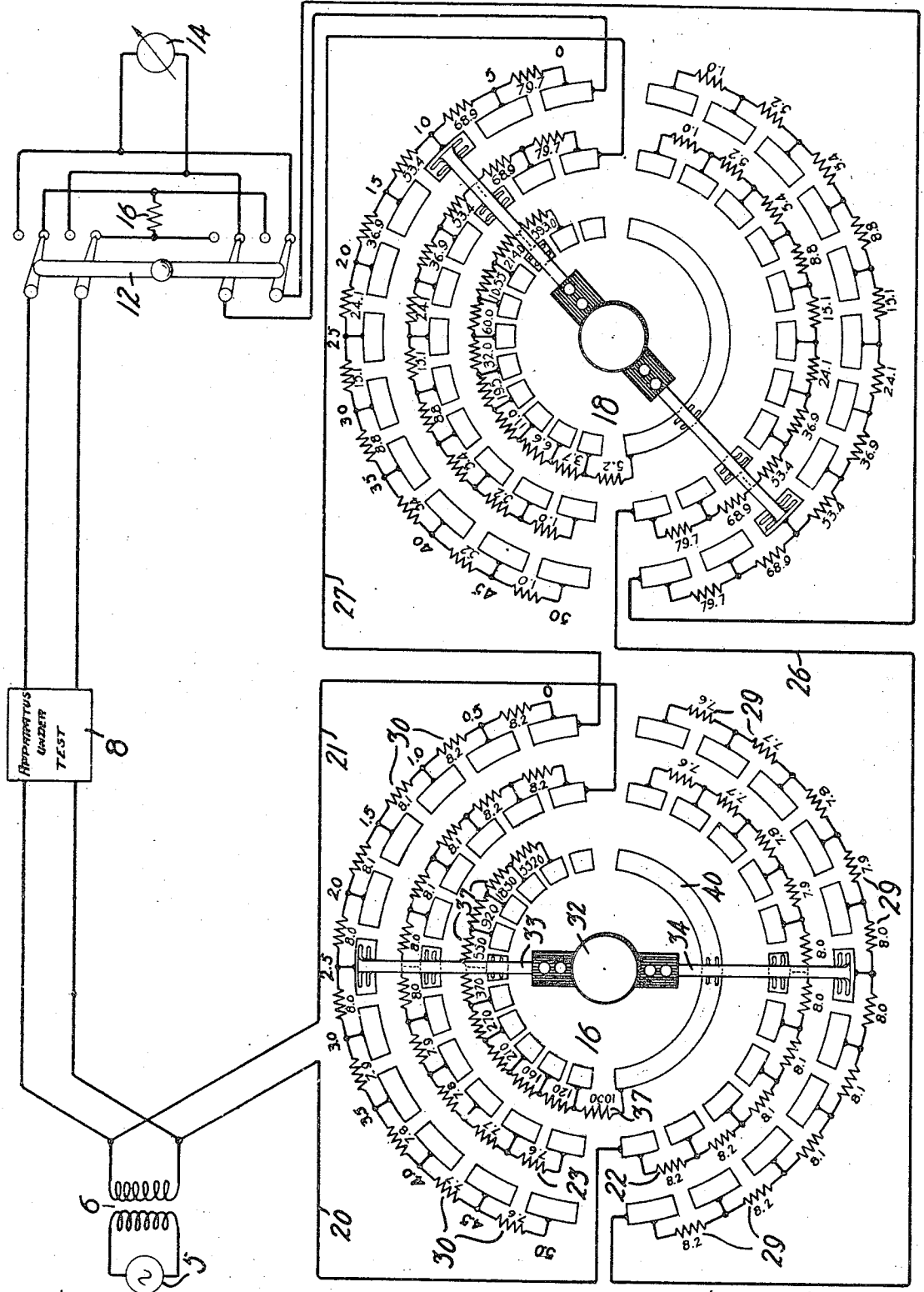

1,472,507

UNITED STATES PATENT OFFICE.

HARALD J. VENNES, OF NEW YORK, N. Y., ASSIGNOR TO WESTERN ELECTRIC COMPANY, INCORPORATED, OF NEW YORK, N. Y., A CORPORATION OF NEW YORK.

ARTIFICIAL LINE.

Application filed December 28, 1921. Serial No. 525,434.

*To all whom it may concern:*

Be it known that I, HARALD J. VENNES, a citizen of the United States, residing at New York, in the county of Bronx, State of New York, have invented certain new and useful Improvements in Artificial Lines, of which the following is a full, clear, concise, and exact description.

This invention relates to artificial lines and more particularly to artificial lines adapted to be used in making transmission measurements of electrical circuits.

An object of the invention is to adjust the attenuation of an artificial line in a simple manner and at the same time to maintain its input and output impedances constant.

When, according to a well-known method, the transmission through a circuit of unknown attenuation is compared with the transmission through a circuit, the attenuation of which is predetermined or calibrated, it is desirable to have the impedance of the known circuit equal that of the unknown circuit. It has heretofore been customary to employ an artificial line comprising a plurality of H-type or T-type sections having the same impedances, but differing in attenuation, and so arranged that any desired number of sections could be connected in tandem, thus introducing the required amount of attenuation. By this method, in order to measure transmission in very small steps, so many sections of artificial lines would be required that the apparatus would be very cumbersome and expensive.

In accordance with this invention, the advantage of an artificial line having symmetrical sections is retained, but the disadvantage of having a great number of sections is avoided. Four adjustable series resistances and one adjustable shunt resistance are so arranged as to form an H-type artificial line section and are preferably connected with each other by a common switch bar or the like, so that they may be simultaneously adjusted in such a way that the input and output impedances of the section will remain constant, while the attenuation is increased or decreased. In the preferred form of the invention, two adjustable sections are connected in tandems, one being calibrated in small steps and the other in large steps, for example, .5 mile steps and 5 mile steps, respectively. It is customary in telephone practice to calculate attenuation in terms of miles loss. This is arbitrarily determined by the following formula:

$$L = 21.125 \, \text{Log.}_{10}\left(\frac{I_1}{I_2}\right)$$

in which $L$ represents loss in miles; $I_1$ represents current entering a circuit, and $I_2$ represents current leaving the circuit.

Further objects of the invention will appear from the following detailed description and claims taken in connection with the accompanying drawing which represents schematically one embodiment of the invention.

Referring to the drawing by reference numerals, a source of alternating current 5 is connected through a transformer 6 to two parallel paths, one comprising a line or other circuit 8, the loss of which is to be measured, and the other comprising an artificial line 10 constructed in accordance with this invention. These paths are connected alternately by a reversing switch 12 to an indicating instrument 14, which may, be for example, a receiver, a thermocouple, milliammeter, or any known device for detecting alternating currents. A resistance 16, equal to the impedance of indicating device 14, is alternately connected to the path which is not connected to device 14.

The artificial line 10 comprises a section 16 which, as will be noted from the upper scale, is calibrated in .5 mile steps. Conductors 20 and 21, leading from transformer 6, are connected respectively to adjustable resistances 22 and 23, respectively. Outgoing conductors 26 and 27 are connected to adjustable series resistances 29 and 30. A switch comprising turn button 32, and switch arms 33 and 34 insulated from each other and having suitable brushes thereon, is employed to adjustably connect resistances 23 and 30 and 22 and 29, respectively. Arm 33 also has a brush contacting with an adjustable shunt resistance 37, and arm 34 has a brush contacting with an arc-shaped contact 40, which is connected to one end of resistance 37. All the brushes associated with either arm 33 or 34, respectively, are electrically connected. It will be apparent from the arrangement shown in the drawing that when turn button 32 is operated to decrease the amount of series resistance, the value of shunt resistance 37 will be increased and vice versa. Values of the separate components of resistances 22, 23, 29, 30 and 37 are given in ohms on the drawing for a case where it was desired to simulate lines or networks having terminal impedances of 600 ohms and to provide a loss in .5 mile steps from 0 to 5 miles. The impedance looking into the line section 16 from either end is maintained at 600 ohms, regardless of the setting of the switch arms 33, 34.

The arrangement of section 18 is identical with that of section 16 and need not be described in detail, except to state that the values of the resistance elements are such that 5 mile steps in attenuation from 0 to 50 miles are obtained, the input and output impedance being also maintained at 600 ohms. When using sections 16 and 18 in tandem, as shown in the drawing, losses from zero to 55 miles may be obtained in steps of .5 of a mile.

The preferred method of using this apparatus is to apply alternating currents from source 5 of any desired frequency or frequencies and to adjust artificial line sections 16 and 18 until the indication in device 14 is the same in either position of the switch 12, thereby indicating that the loss in transmission in circuit 8 is equal to that in artificial line 10. The latter, of course, may be indicated by suitable scales.

In cases where it is unnecessary to have opposite sides of artificial line 10 balanced, the series resistances on one side may be omitted, the remainder of the network being in the form of a T type network. While an arrangement has been shown which is especially well adapted for use with dial switches, it is to be understood that the invention is not limited to the specific arrangement shown, but that any suitable apparatus may be employed for carrying out the invention. It is, of course, obvious that this artificial line is adapted to be used for purposes other than the one herein described.

What is claimed is:

1. An artificial line comprising two series adjustable impedances and an intermediate shunt adjustable impedance, and means for simultaneously adjusting said impedances.

2. An artificial line comprising two series adjustable impedances and an intermediate shunt adjustable impedance, and means for simultaneously adjusting said impedances in a manner to maintain the input and output impedances of said line constant.

3. An artificial line as in claim 2, in which said impedances consist substantially wholly of resistance.

4. An H-shaped artificial line comprising four series adjustable resistances and an intermediate shunt adjustable resistance and means for simultaneously adjusting said resistances.

5. An artificial line as in claim 4, in which said resistances have contacts arranged in concentric arcs and pivoted means coacting with said contacts to interconnect said resistances.

In witness whereof I hereunto subscribe my name this 24th day of December, A. D., 1921.

HARALD J. VENNES.